United States Patent
Karlquist

(10) Patent No.: US 6,865,345 B2
(45) Date of Patent: Mar. 8, 2005

(54) FREQUENCY TRANSLATING DEVICES AND FREQUENCY TRANSLATING MEASUREMENT SYSTEMS THAT UTILIZE LIGHT-ACTIVATED RESISTORS

(75) Inventor: Richard K. Karlquist, Cupertino, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 706 days.

(21) Appl. No.: 09/942,006

(22) Filed: Aug. 28, 2001

(65) Prior Publication Data

US 2003/0053178 A1 Mar. 20, 2003

(51) Int. Cl.$^7$ .............................................. H04B 10/00
(52) U.S. Cl. ...................... 398/115; 398/163; 398/183; 398/186
(58) Field of Search ................................ 378/115, 163, 378/183, 185, 186, 197

(56) References Cited

U.S. PATENT DOCUMENTS

| | | | | |
|---|---|---|---|---|
| 6,373,611 B1 | * | 4/2002 | Farhan et al. ............... | 398/182 |
| 6,501,942 B1 | * | 12/2002 | Weissman et al. ............ | 455/14 |
| 6,556,327 B1 | * | 4/2003 | Ohya et al. ................. | 398/198 |
| 6,643,417 B2 | * | 11/2003 | Strutz et al. ................ | 385/1 |
| 6,731,880 B2 | * | 5/2004 | Westbrook et al. .......... | 398/115 |

* cited by examiner

*Primary Examiner*—Leslie Pascal
*Assistant Examiner*—Dzung Tran

(57) ABSTRACT

A frequency translating device (FTD) includes at least one light-activated resistor (LAR) connected to down-convert a radio frequency (RF) to an intermediate frequency (IF) and to up-convert an IF to an RF and a source of modulated light that is optically connected to the LAR. The source of modulated light is modulated in response to a local oscillator (LO) and the LAR is activated in response to the modulated light. Modulated light can be generated from a light source and an LO by, for example, directly modulating the light source, modulating a transmission switch that blocks the transmission of light to the LAR, or modulating a light path switch. The LAR-based FTD can be used as a reciprocal FTD to characterize another FTD in a three-pair measurement system. An FTD may include more than one LAR to form, for example, single-balanced and double-balanced LAR-based FTDs.

26 Claims, 9 Drawing Sheets

DSB Measurement Flow Diagram

FREQUENCY TRANSLATING DEVICES AND FREQUENCY TRANSLATING MEASUREMENT SYSTEMS THAT UTILIZE LIGHT-ACTIVATED RESISTORS

FIELD OF THE INVENTION

The invention relates to frequency translating devices (FTDs) and systems and methods for characterizing the conversion responses of FTDs.

BACKGROUND OF THE INVENTION

FTDs (e.g., mixers, converters, and tuners) are devices that convert radio frequencies (RF) to intermediate frequencies (IF) when used for down-conversion or IFs to RFs when used for up-conversion. In a three-port mixer, the down-conversion of an RF to an IF or the up-conversion of an IF to an RF involves mixing an input signal with a local oscillator (LO) signal. Mixing an input signal with an LO signal generates two primary output signals having frequencies that are the sum of the input signal frequency and the LO signal frequency and the difference between the input signal frequency and the LO signal frequency. In down-conversion, an RF signal is mixed with an LO signal to generate a lower frequency IF signal and in up-conversion an IF signal is mixed with an LO signal to generate a higher frequency RF signal.

As the demand for wireless communications services increases, more advanced FTDs with tighter operating tolerances are being developed. To support the development of new FTDs and the integration of FTDs into RF communications systems, the conversion responses of FTDs need to be characterized. Two conversion responses of FTDs that are typically characterized include conversion loss and phase shift. The conversion loss of an FTD is a measure of the difference in amplitude between the input signal (the RF in down-conversion and the IF in up-conversion) and the output signal (the IF in down-conversion and the RF in up-conversion). The phase shift of an FTD is a measure of the phase shift between the input signal and the output signal.

A technique for characterizing the conversion response of an FTD is disclosed in U.S. Pat. No. 5,937,006 issued to Clark et al. (hereinafter Clark). Clark discloses a measurement technique for characterizing an FTD that involves making at least three different measurements using three different pairs of FTDs, where the three different pairs of FTDs are put together from a set of three different FTDs. According to the three-pair measurement technique, one of the FTDs is the device under test (DUT) and the other two FTDs are test devices (referred to as test mixer 1, TM1, and test mixer 2, TM2) that support the characterization of the DUT. Each measurement is performed on a different pair of FTDs taken from the set of three. FIG. 1 depicts the basic structure of a three-pair measurement system 100 for characterizing the single side band conversion response of an FTD. The three-pair measurement system includes a vector network analyzer (VNA) 102, a controller 104, an up-conversion FTD 110, a down-conversion FTD 112, connections 106 and 108 between the VNA and the up-conversion and down-conversion FTDs, an optional phase shifter 114, an LO 116, and a splitter 118. Although FIG. 1 depicts the basic structure of a three-pair measurement system, an actual implementation may include additional components, such as filters, attenuators, and isolators, which are used to improve the measurement quality. Characterizing the single side band response of a DUT FTD using the three-pair measurement system involves three separate measurements with the DUT, TM1, and TM2 used in different combinations as the up-conversion FTD and the down-conversion FTD. The connections 106 and 108 couple the FTDs to the VNA and may include ports and connection cables as is known in the field.

FIG. 2 is a measurement flow diagram for characterizing the conversion response of a single side band DUT. The flow diagram indicates the different combinations of the DUT, TM1, and TM2 that are used to characterize the DUT. In measurement A (step 220), an IF is input into the up-conversion FTD (the DUT) for up-conversion to an RF and then into the down-conversion FTD (TM1) for down-conversion back to an IF. The result of measurement A is a measurement $M_A(f)$ that is used to determine a response $R_A(f)$. In measurement B (step 222), an IF is input into the up-conversion FTD (the DUT) for up-conversion to an RF and then into the down-conversion FTD (TM2) for down-conversion back to an IF. The result of measurement B is a measurement $M_B(f)$ that is used to determine a response $R_B(f)$. In measurement C (step 224), an IF is input into the up-conversion FTD (TM1) for up-conversion to an RF and then into the down-conversion FTD (TM2) for down-conversion back to an IF. The result of measurement C is a measurement $M_C(f)$ that is used to determine a response $R_C(f)$. The single side band response of the DUT is then calculated (step 226) as $R_{DUT}(f)=[R_A(f)+R_B(f)-R_C(f)]/2$.

One requirement of the three-pair measurement system is that one of the test FTDs (either TM1 or TM2) must have a reciprocal conversion response. That is, the conversion response of the reciprocal FTD must be the same whether the FTD is used as a down-conversion FTD 112 or as an up-conversion FTD 110. In the three-pair test system, the reciprocal FTD is the FTD that is used as the down-conversion FTD in one of the measurements and as the up-conversion FTD in another one of the measurements. Referring to the flow diagram of FIG. 2, TM1 is used as the down-conversion FTD in measurement A (step 220) and as the up-conversion FTD in measurement C (step 224). To accurately determine the conversion response of the DUT, TM1 must have a reciprocal conversion response.

Referring back to FIG. 1, the basic structure of a three-pair measurement system 100 for characterizing the double side band conversion response of a DUT is the same as the measurement system for characterizing a single side band response except that the measurement system includes the phase shifter 114. In the embodiment of FIG. 1, the phase shifter is located between the LO 116 and the down-conversion FTD 112 so that the phase of the LO can be shifted before it is inserted into the down-conversion FTD.

FIG. 3 is a measurement flow diagram for characterizing a double side band response of a DUT. The flow diagram indicates the different combinations of the DUT, TM1, TM2, and the phase of the LO that are used to characterize the DUT. The double side band characterization involves initial measurements A, B, and C (steps 320, 322, and 324) that are similar to the A, B, and C measurements (steps 220, 222, and 224) described above with reference to FIG. 2. The double side band characterization includes additional measurements A', B', and C' that are made with the same FTD configuration however the phase of the LO that is inserted into the down-conversion FTD is shifted by 90 degrees to obtain the A', B', and C' measurements. This technique enables calculation of the upper side band (USB) and the lower side band (LSB) conversion responses of the DUT. As shown in FIG. 3 at step 326, the USB conversion response of the DUT is calculated as $R_{DUT\ USB}(f)=[R_{A\ USB}(f)+R_{B\ USB}(f)-R_{C\ USB}(f)]/2$ and the LSB conversion response of the DUT is calculated as $R_{DUT\ LSB}(f)=[R_{A\ LSB}(f)+R_{B\ LSB}(f)-R_{C\ LSB}(f)]/2$.

As with the single side band measurement technique, one of the test FTDs (either TM1 or TM2) must have a reciprocal conversion response. Referring to FIG. 3, TM1 is used as the down-conversion FTD in the A and A' measurements (step 320) and is used as the up-conversion FTD in the C and C' measurements (step 324). To determine the conversion response of the DUT, TM1 must have a reciprocal conversion response.

FIGS. 4, 5, and 6 depict examples of well-known three-port mixer FTDs that can be utilized as the test mixers in a three-pair measurement system. The mixers are passive diode-based mixers in which the mixer diode(s) 430, 530, and 630 is/are driven by the LO of the test system. The mixer of FIG. 4 is an example of a single diode mixer, the mixer of FIG. 5 is an example of a single balanced mixer, and the mixer of FIG. 6 is an example of a double balanced mixer (DBM). Typical solid state mixer diodes have a threshold voltage of 0.3 volts and are biased by an LO. FIG. 7 depicts the voltage modulation of an example LO, having an amplitude of 0.3 volts, that can be used to bias the mixers of FIGS. 4–6. The voltage modulation of the passive diode-based mixers causes the mixer diodes to be forward biased and reversed biased in an alternating fashion, thereby mixing an RF with the LO to generate an IF or mixing an IF with the LO to generate an RF.

Although the three-pair measurement system for characterizing an FTD requires at least one reciprocal FTD to provide quality measurement results, current passive diode-based mixers, such as the example mixers depicted in FIGS. 4–6, do not exhibit the required reciprocal conversion response. Typically, passive diode-based mixers exhibit greater conversion loss during down-conversion than during up-conversion. Clark discloses a calibration technique that involves adjusting multiple attenuators to reduce reflections and optimize conversion linearity as a way to ensure that at least one of the FTDs has a reciprocal conversion response. Many measurements of mixers show that linearity alone is insufficient to guarantee reciprocity, and reflections are irrelevant with respect to reciprocity.

In view of the need to characterize FTDs, especially three-port mixer FTDs and in view of the need to utilize an FTD with a reciprocal conversion response in a three-pair measurement system and method, what is needed is a reciprocal FTD that can be incorporated into a three-pair measurement system and method.

SUMMARY OF THE INVENTION

A frequency translating device (FTD) includes at least one light-activated resistor (LAR) connected to down-convert an RF to an IF and to up-convert an IF to an RF and a source of modulated light that is optically connected to the LAR. The source of modulated light is modulated in response to an LO and the LAR is activated in response to the modulated light. LARs are incorporated into the FTD because LARs exhibit relatively small variations in capacitance in comparison to traditional mixer diodes, such as Schottky diodes. Reducing variations in capacitance of an FTD produces an FTD with a more reciprocal conversion response, which is a desirable characteristic for an FTD that is used in a three-pair measurement system.

Modulated light can be generated from a light source and an LO in various ways. For example, the modulated light source can be directly modulated by the LO, the modulated light source can be used to activate a transmission switch that blocks the transmission of light to the LAR, or a light path switch can be modulated by the LO.

The FTD may include additional LARs to form single-balanced and double-balanced FTDs.

A method for operating an FTD includes providing modulated light to at least one LAR, with the light being modulated in response to an LO, down-converting an RF to an IF using the LAR to obtain a down-conversion response, and up-converting an IF to an RF using the LAR to obtain an up-conversion response. Using a LAR-based FTD for down-conversion and up-conversion controls variations in capacitance and improves the reciprocity of the FTD. In an embodiment, the LAR-based FTD is used for down-conversion and up-conversion in a three-pair measurement method.

Another embodiment of the invention is a three-pair measurement system for determining the conversion response of a device under test (DUT), where the DUT is an FTD. The system includes an analyzer, a controller and means for coupling the DUT to a first test FTD (TM1) during a first measurement, for coupling the DUT to a second test FTD (TM2) during a second measurement, and for coupling TM1 to TM2 during a third measurement, where TM1 and TM2 are both FTDs. The first measurement provides a first conversion response of the DUT coupled with TM1, with one of the coupled DUT and TM1 being an up-converter FTD and the other one of the coupled DUT and TM1 being a down-converter FTD. The second measurement provides a second conversion response of the DUT coupled to TM2, with one of the coupled DUT and TM2 being an up-converter FTD and the other one of the coupled DUT and TM2 being a down-converter FTD. The third measurement provides a third conversion response of TM1 coupled with TM2, with one of the coupled TM1 and TM2 being an up-converter FTD and the other one of the coupled TM1 and TM2 being a down-converter FTD.

One of the TM1 FTD and TM2 FTD has reciprocal up-conversion and down-conversion responses, where the reciprocal FTD is an up-converter during one of the first, second, or third measurements and is a down-converter during another one of the first, second, or third measurements. The reciprocal FTD includes means for controlling variations in capacitance of the reciprocal FTD to produce a reciprocal conversion response between the down-conversion and the up-conversion. The means for controlling variations in capacitance of the reciprocal FTD includes at least one LAR connected to down-convert and to up-convert and a source of modulated light that is optically connected to the LAR. The source of modulated light generates modulated light that is related to a local oscillator (LO) and the LAR is activated in response to the modulated light from the modulated light source.

The analyzer of the measurement system obtains the first, second, and third measurements by providing an input signal at a first connection and by sampling an output signal from a second connection. The controller of the measurement system calculates the conversion response of the DUT from the first, second, and third conversion responses.

A method for determining the conversion response of a DUT, where the DUT is an FTD, involves three measurements. The first measurement involves measuring a first conversion response of the DUT coupled with a first test device (TM1), where one of the coupled DUT and TM1 is an up-converter FTD and the other one of the coupled DUT and TM1 is a down-converter FTD. The second measurement involves measuring a second conversion response of the DUT coupled with a second test device (TM2), where one of the coupled DUT and TM2 is an up-converter FTD and the other one of the coupled DUT and TM2 is a down-converter FTD. The third measurement involves measuring a third conversion response of the TM1 coupled with TM2, where one of the coupled TM1 and TM2 is an up-converter FTD and the other one of the coupled TM1 and TM2 is a down-converter FTD and where one of the TM1 FTD and TM2 FTD has reciprocal up-conversion and down-conversion responses. The reciprocal FTD is an up-converter during one of the first, second, or third measurements and is a down-converter during another one of the first, second, or third measurements. The reciprocal FTD includes at least one LAR, wherein operation of the reciprocal FTD includes providing modulated light to the at least one LAR that is modulated in response to a local oscillator (LO), wherein variations in capacitance of the at least one LAR are controlled to make the down-conversion response reciprocal to the up-conversion response. The conversion response of the DUT is calculated from the first, second, and third conversion responses.

Other aspects and advantages of the present invention will become apparent from the following detailed description, taken in conjunction with the accompanying drawings, illustrating by way of example the principles of the invention. Other embodiments of the invention may provide other advantages in addition to, or in lieu of, those described above.

DETAILED DESCRIPTION

Figure 8:
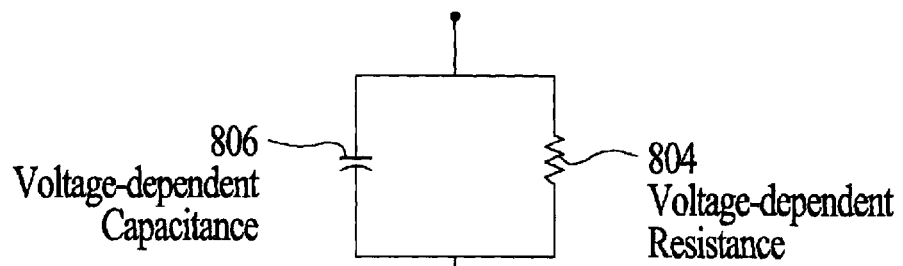
FIG. 8 depicts a diode model that includes voltage-dependent capacitance and voltage-dependent resistance.

As stated above, it is experimentally observed that passive diode-based mixers exhibit greater conversion loss during down-conversion than during up-conversion. The cause of this non-reciprocal behavior is a process known as parametric amplification enabled by the inherent voltage-dependent parasitic capacitance exhibited by all diodes. A diode can be modeled sufficiently for present purposes as a voltage dependent resistance 804 in parallel with a voltage-dependent capacitance 806, as shown in FIG. 8. The LO voltage that drives the resistive component of the diode to make the diode act as a switch is also available to drive the capacitive component. This causes pumping of charge through the capacitor, which is non-linear because of the voltage-dependence of the capacitance. The non-linear pumping results in parametric amplification, wherein power from the LO is converted to the output frequency. Parametric amplifiers always have gain when up-converting and loss when down-converting. Thus the parametric amplification causes destructive interference to the normal mixing process in down-converters, resulting in higher conversion loss. On the other hand, it causes constructive interference (i.e., enhancement) when up-converting, resulting in lower conversion loss.

As described above, reciprocal mixers are needed to make accurate conversion loss measurements of a DUT. Accurate conversion loss measurements require the elimination of parametric amplification that is caused by capacitive pumping by the LO. Therefore, the reciprocity of a mixer can be improved by decreasing capacitive pumping to negligible levels.

Most general-purpose mixers have enough parametric pumping to cause measurable non-reciprocity, however reciprocity is not a design requirement and therefore there is no reason to reduce the capacitive pumping. Furthermore, designing mixers for low pumping tends to degrade other performance numbers that are usually of interest.

Figure 6:
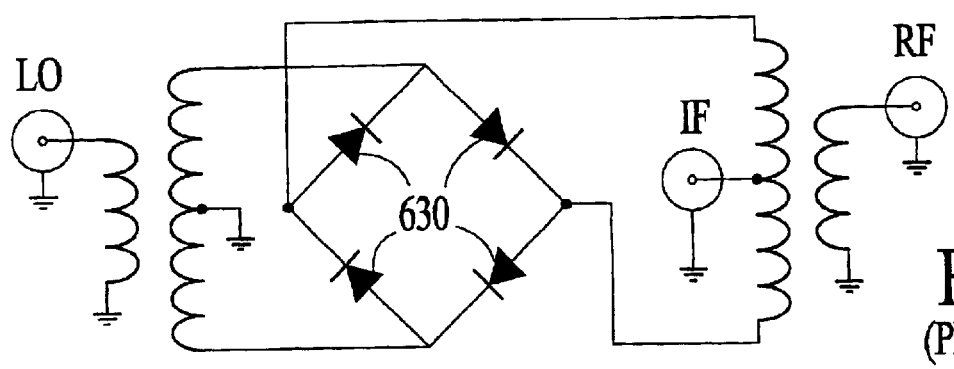
FIG. 6 is an example of a double balanced mixer.
Figure 7:
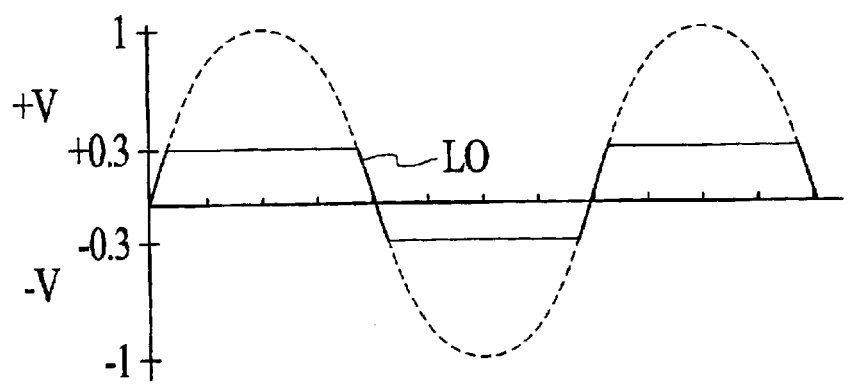
FIG. 7 depicts the voltage across one of the diodes in the mixers of FIGS. 4, 5, and 6 as a function of time.

The DBM mixer of FIG. 6 represents the vast majority of diode mixers currently in use. FIG. 7 depicts the typical voltage waveform across one of the diodes. The voltage is constrained to a peak to peak value approximately equal to twice the threshold voltage of the diode. In this embodiment, the diode is a Schottky diode, having a turn on voltage of 0.3V, resulting in a peak to peak voltage of 0.6V. In a mixer of the design of FIG. 6, the peak LO voltage will typically be limited to the turn on voltage (typically 0.3V for a Schottky diode), as shown in FIG. 7. Thus the total voltage range for the diode will be 0.6V. The capacitance changes substantially over this voltage range resulting in parametric amplification and non-reciprocal mixing.

The problem of parasitic voltage-dependent capacitance can be reduced by replacing the diode-based mixers with mixers that utilize light-activated resistors to mix two signals.

A light-activated resistor (LAR) is a device that has a resistance that varies with the intensity of light that is incident on the LAR. In an embodiment, the LAR is a region of semiconductor material in a conductive path that exhibits high resistance when the intensity of incident light is low, low resistance when the intensity of incident light is high and relatively small variations in capacitance. Because the level of resistance varies with the intensity of incident light, the region of semiconductor material can be used in conjunction with a light source as an optically activated switch that controls the flow of electrical current along a conductive path. That is, when no light or low intensity light is incident on the region of semiconductor material, the switch is "off" and when high intensity light is incident on the region of semiconductor material, the switch is "on." In an embodiment, the LAR is a region of GaAs.

As is well known in the field of diode-based mixers, mixing is accomplished by modulating the activation of the mixer diode(s) at a desired modulation rate. Typically, the modulation rate is controlled by an LO. As with the diodes in diode-based mixers, the LARs in LAR-based mixers must be modulated to accomplish mixing. Modulating the LAR(s) in LAR-based mixers requires supplying modulated light to the LAR(s), such that high intensity light turns the LAR(s) on and low intensity light turns the LAR(s) off in a periodic fashion.

Figure 9:
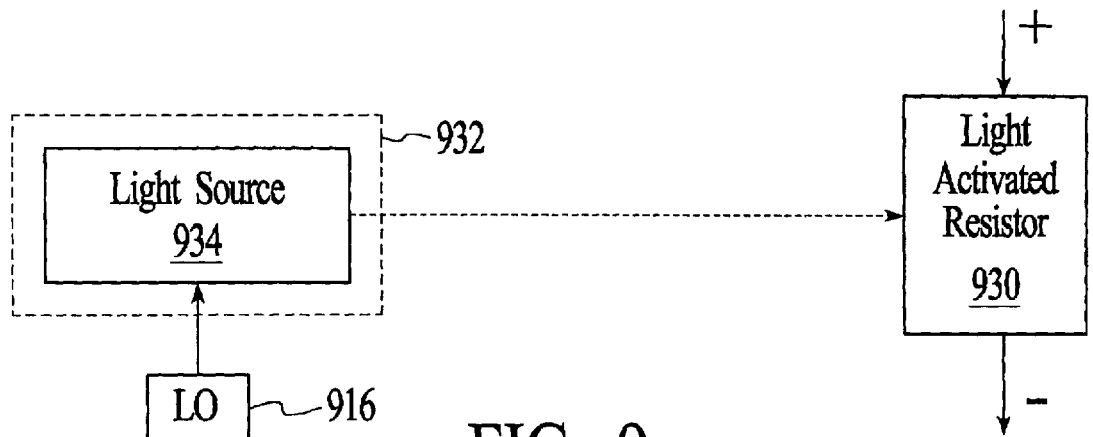
FIG. 9 is an example of a LAR and a modulated light source.
Figure 10:
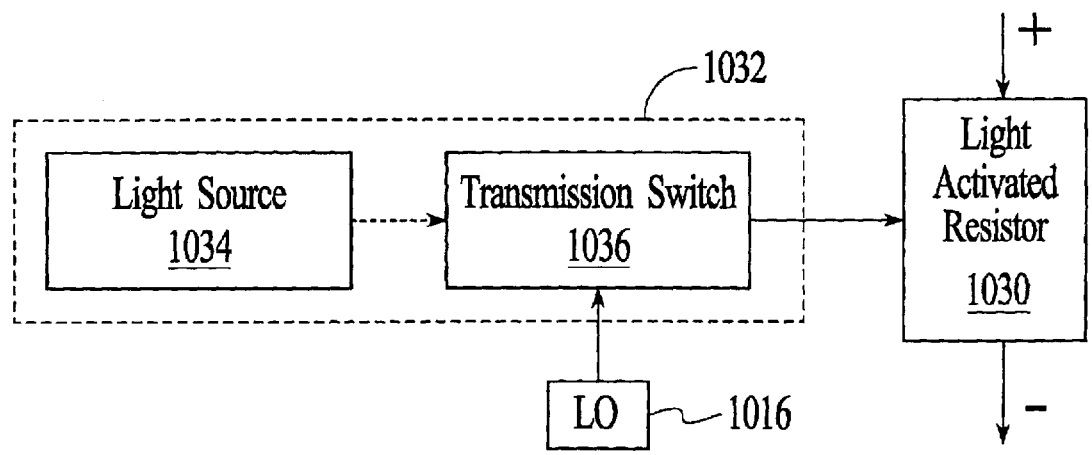
FIG. 10 is an example of a LAR and a modulated light source that includes a light source and a transmission switch.
Figure 11:
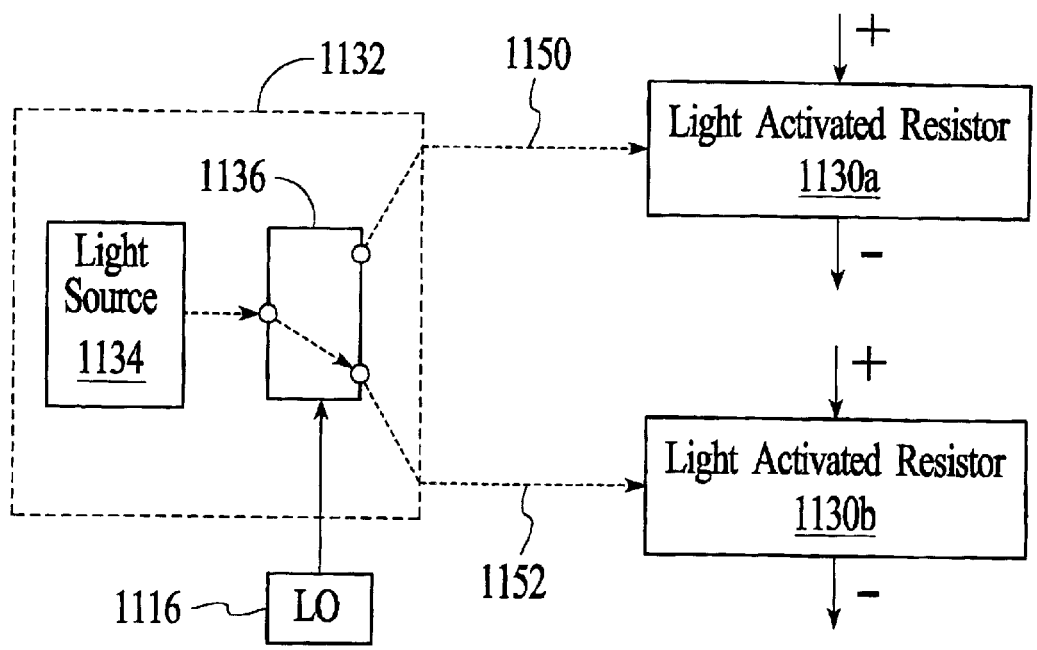
FIG. 11 is an example of two LARs and a modulated light source that includes a light source and a light path switch.

FIGS. 9–11 depict different embodiments of modulated light sources that can be used with an LO to supply modulated light to a LAR. FIG. 9 depicts an embodiment of a modulated light source 932, that includes a light source 934 and an LO input, in which the light source is directly modulated by the LO 916. That is, the light source is turned on and off in response to the LO. When the light is turned on, the LAR 930 is on (that is, current flows) and when the light is turned off, the LAR is off (that is, current does not flow). In another embodiment, the intensity of the light generated by the light source may be modulated by the LO such that the modulated light periodically has enough intensity to turn on the LAR (to make the LAR conduct electrical current at a sufficiently high level). The light source may include a laser light source, or any other source of light that can activate a LAR.

FIG. 10 depicts an embodiment of a modulated light source 1032 that includes a light source 1034 and a transmission switch 1036. The transmission switch transmits light in one mode and blocks the transmission of light in another mode. The light source generates a constant source of light that is input into the transmission switch. The transmission switch is modulated in response to the LO 1016 to either block or transmit the light from the light source. When the light is blocked by the transmission switch, no light is incident on the LAR 1030 and the LAR is off. When light is transmitted by the transmission switch, the light is incident on the LAR and the LAR is on. In another embodiment, the transmission switch affects the level of light transmission through the switch. For example, in the off state, a non-activating intensity of light passes through the transmission switch and in the on state, an activating intensity of light passes through the transmission switch.

FIG. 11 depicts an embodiment of a modulated light source 1132 that includes a light source 1134 and a light path switch 1136. The light path switch transmits light on a first path 1150 in a first mode and transmits light on a second path 1152 in a second mode. The light source generates a constant source of light that is input into the light path switch. The light path switch is modulated in response to the LO 1116 to transmit light in the first path or the second path. When the light is transmitted in the first path, the first LAR 1130a is turned on and the second LAR 1130b is turned off. Likewise, when the light is transmitted in the second path, the second LAR is turned on and the first LAR is turned off. In another embodiment, the light path switch effects the level of light transmission in each path such that an activating intensity of light is transmitted through the two paths in an alternating fashion. Although a light path switch with two light paths is depicted, a light path switch with more than two light paths is possible.

In accordance with the invention, the LARs and modulated light sources, such as the LARs and modulated light sources described with reference to FIGS. 9–11, are incorporated into LAR-based FTDs in order to produce FTDs with reduced variations in capacitance. As stated above, reducing variations in capacitance (i.e., voltage-dependent capacitance in voltage-activated diodes) of an FTD produces an FTD with a more reciprocal conversion response, which is a desirable characteristic for an FTD that is used in a three-pair measurement system.

Figure 4:
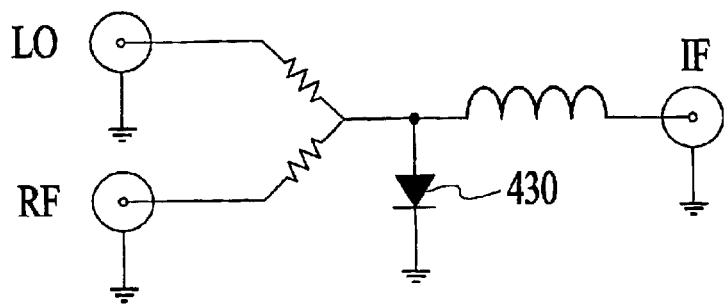
FIG. 4 is an example of a single diode mixer.
Figure 5:
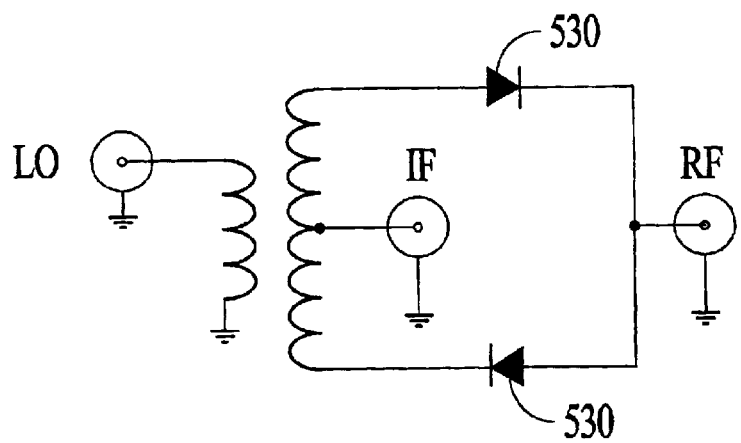
FIG. 5 is an example of a single balanced mixer.
Figure 12:
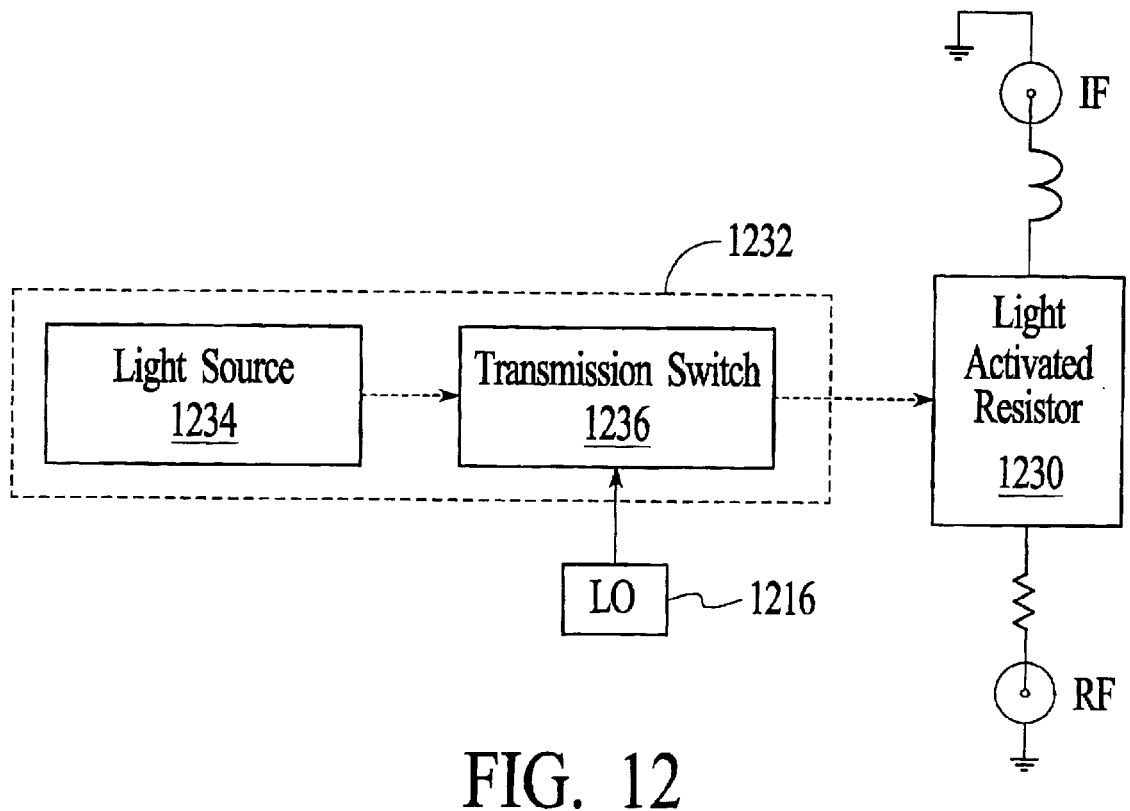
FIG. 12 is an example of a single LAR mixer that is activated by a modulated light source in accordance with an embodiment of the invention.
Figure 13:
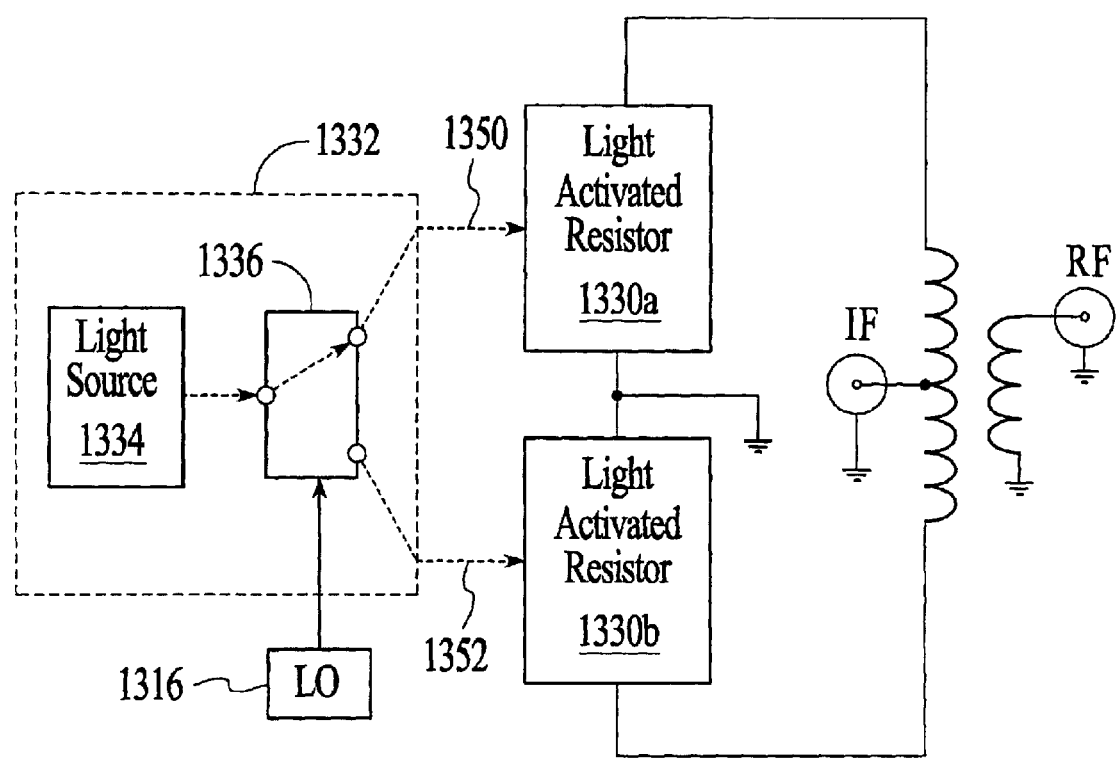
FIG. 13 is an example of a single balanced LAR-based mixer that is activated by a modulated light source in accordance with an embodiment of the invention.
Figure 14:
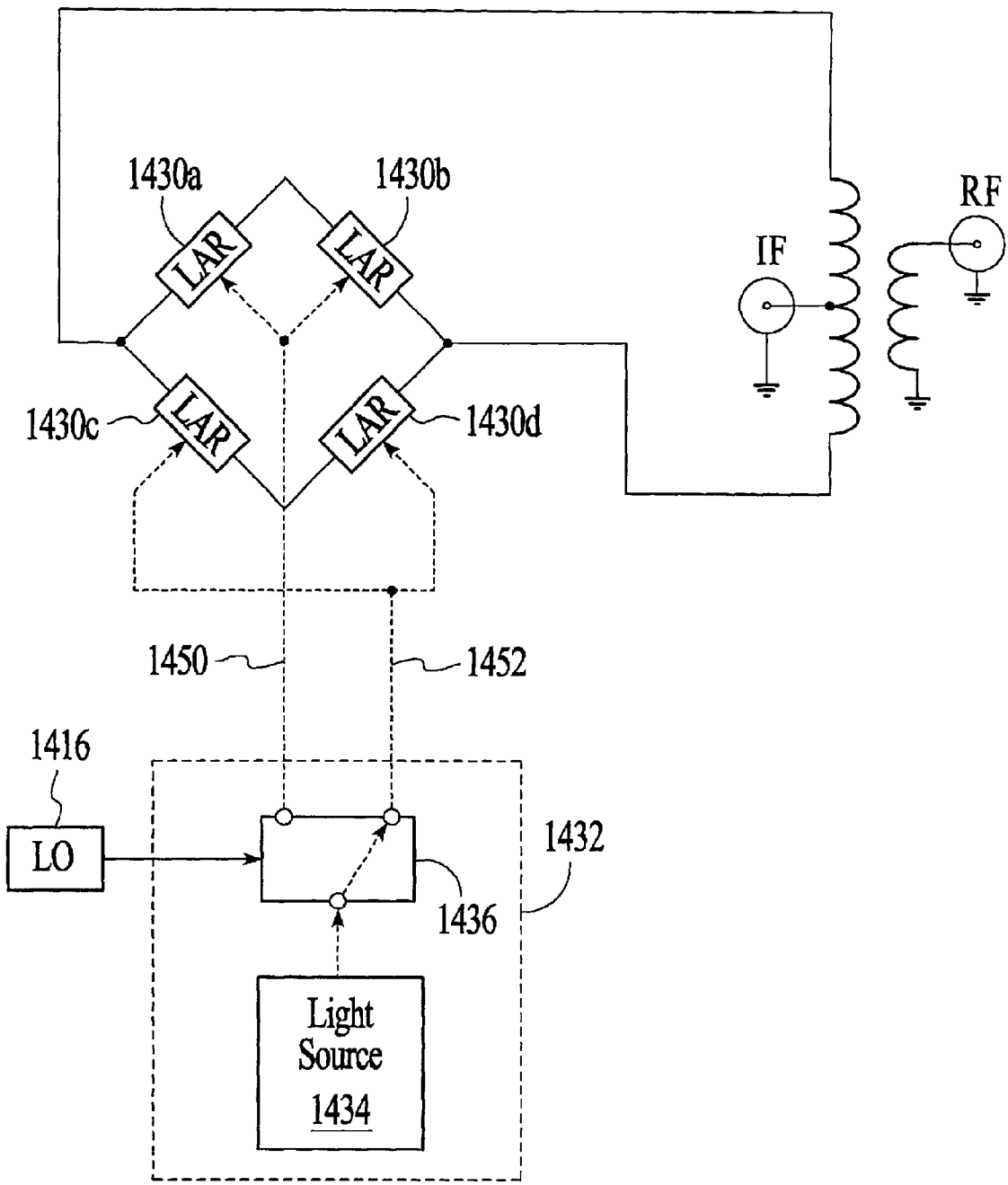
FIG. 14 is an example of a double balanced LAR-based mixer that is activated by a modulated light source in accordance with an embodiment of the invention.

FIGS. 12–14 depict example embodiments of FTDs that are similar to the well-known diode-based FTDs depicted in FIGS. 4–6 in which the parasitic voltage-dependent capacitance of the FTDs is reduced by replacing the mixer diode(s) with a LAR or LARs. FIG. 12 depicts an embodiment of a single LAR mixer, FIG. 13 depicts an embodiment of a single-balanced LAR-based mixer, and FIG. 14 depicts an embodiment of a double-balanced LAR-based mixer. The example LAR-based mixers each include a modulated light source 1232, 1332, and 1432 that provides modulated light to the LAR(s) 1230, 1330, and 1430. Referring to the single LAR mixer of FIG. 12, the modulated light source includes a light source 1234 and a transmission switch 1236 as described with reference to FIG. 10. In operation, the transmission switch is modulated by the LO 1216 and modulated light is incident on the LAR 1230. The LAR is turned on and off in response to the modulated light, thereby accomplishing the desired down-conversion or up-conversion.

Referring to the single-balanced LAR-based mixer of FIG. 13, the modulated light source 1332 includes a light source 1334 and a light path switch 1336 as described with reference to FIG. 11. In operation, the light path switch is modulated between a first path 1350 and a second path 1352 in response to the LO 1316. The two LARs 1330a and 1330b are alternately turned on and off in response to the modulated light, thereby accomplishing the desired down-conversion or up-conversion.

Referring to the double-balanced LAR-based mixer of FIG. 14, the modulated light source 1432 includes a light source 1434 and a light path switch 1436 as described above with reference to FIG. 11. In operation, the light path switch is modulated between a first path 1450 and a second path 1452 in response to the LO 1416. Light transmitted in the first path is subsequently divided into two paths that are optically connected to a first pair of LARs 1430a and 1430b and light transmitted in the second path is subsequently divided into two paths that are optically connected to a second pair of LARs 1430c and 1430d. The first pair and second pair of LARs are alternately turned on and off in response to the modulated light, thereby accomplishing the desired down-conversion or up-conversion.

Replacing the mixer diodes with LARs reduces the parasitic voltage-dependent capacitance of the FTDs and causes the FTDs to have a more reciprocal conversion response. Although three embodiments of LAR-based FTDs have been described for example purposes, it should be understood that other embodiments of LAR-based FTDs may be utilized to reduce variations in capacitance of FTDs.

Figure 15:
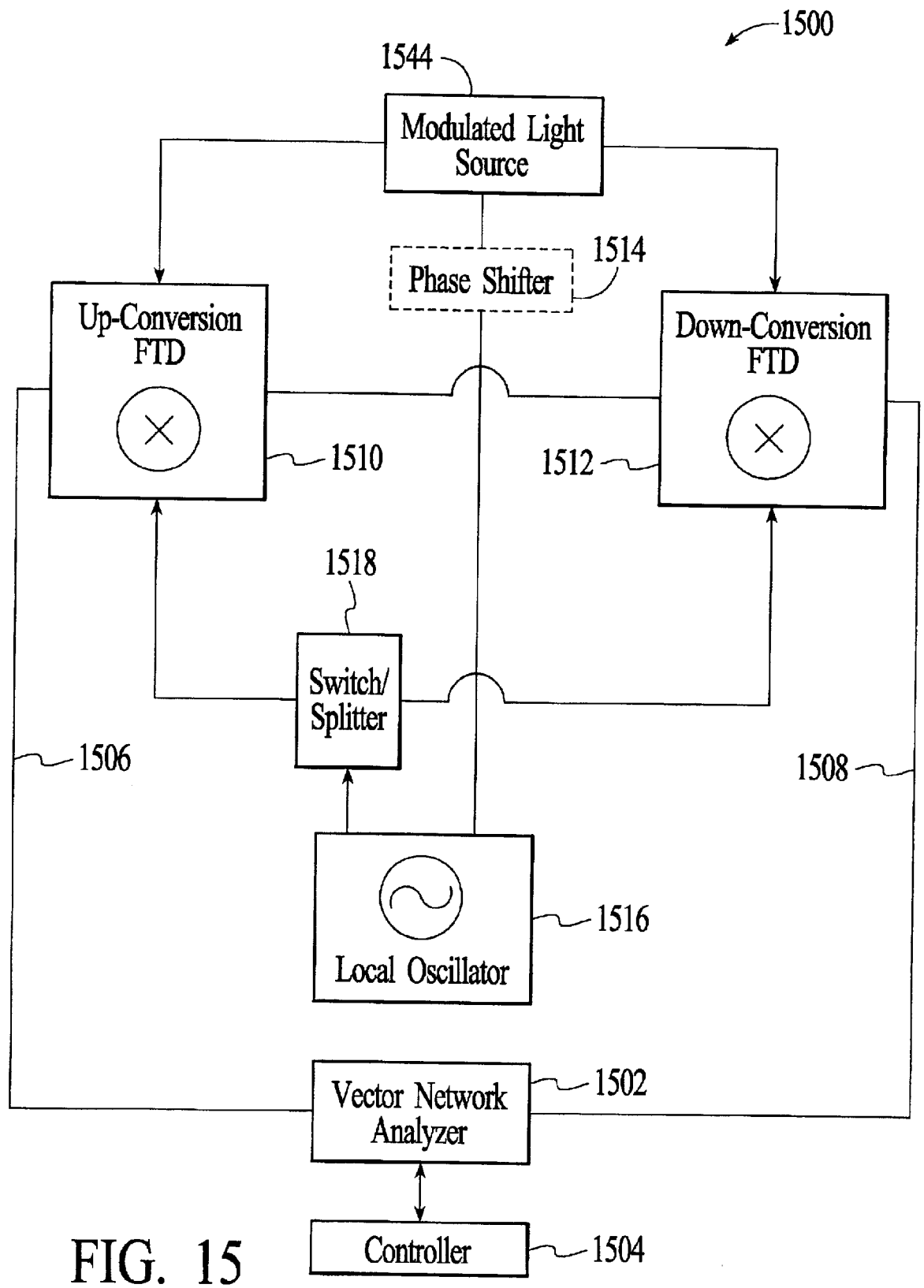
FIG. 15 depicts an embodiment of a three-pair measurement system that is configured to supply modulated light to the reciprocal FTD, which is a LAR-based FTD, in accordance with an embodiment of the invention.

FIG. 15 depicts an embodiment of a three-pair measurement system 1500 that is configured to supply modulated light to any LARs that are utilized in the up-conversion or down-conversion FTDs, and particularly to the reciprocal FTD. The three-pair measurement system can be used in conjunction with the LAR-based FTDs described in FIGS. 12–14 or any other embodiments of LAR-based mixers. The three-pair measurement system includes a VNA 1502, a controller 1504, two test ports PA 1506 and PB 1508, an up-conversion FTD 1510, a down-conversion FTD 1512, an LO 1516, a switch/splitter 1518, a modulated light source 1544, and an optional phase shifter 1514. The three-pair measurement system is similar to the three-pair measurement system disclosed by Clark in U.S. Pat. No. 5,937,006, which is incorporated by reference herein, except that the three-pair measurement system of FIG. 15 utilizes at least one LAR-based FTD and includes the ability to add modulated light to the LAR-based FTD. At a minimum, the reciprocal FTD is a LAR-based FTD however the other FTDs can also be a LAR-based FTDs.

In the embodiment of FIG. 15, the modulated light source 1544 is connected to supply modulated light to the up-conversion FTD 1510 and to the down-conversion FTD 1512. Modulated light is supplied only to the FTDs that utilize a LAR or LARs to perform frequency conversion while the LO is directly supplied to the FTDs that use conventional mixers, such as diode-based mixers, to perform frequency conversion. In an embodiment, modulated light is supplied to the reciprocal FTD and the LO is supplied to all of the other FTDs. In another embodiment, both of the test mixers utilize LARs and are supplied with modulated light while the DUT does not utilize LARs and is supplied with the LO.

Figure 1:
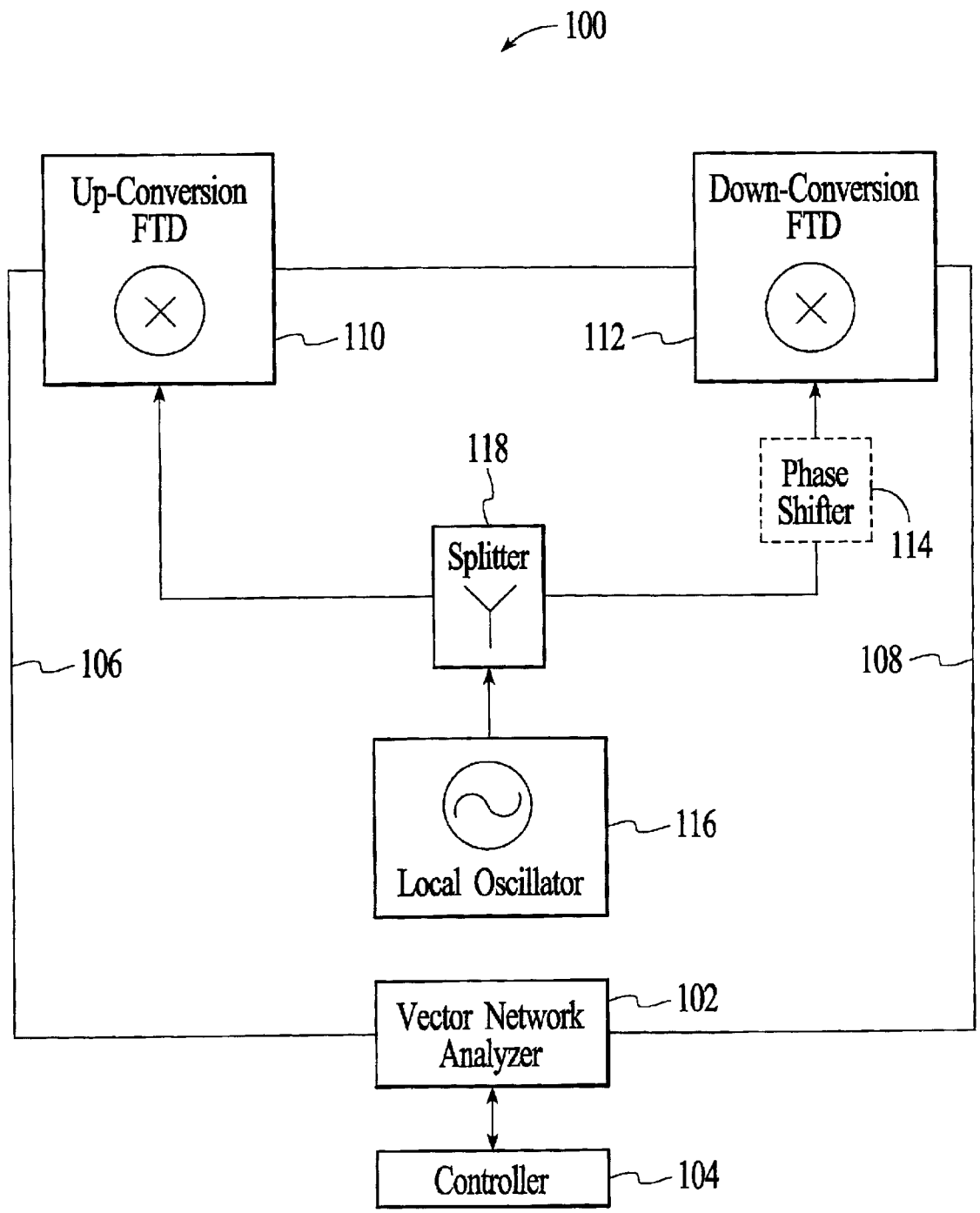
FIG. 1 depicts the basic structure of a prior art three-pair measurement system for characterizing the single side band conversion response of an FTD.
Figure 2:
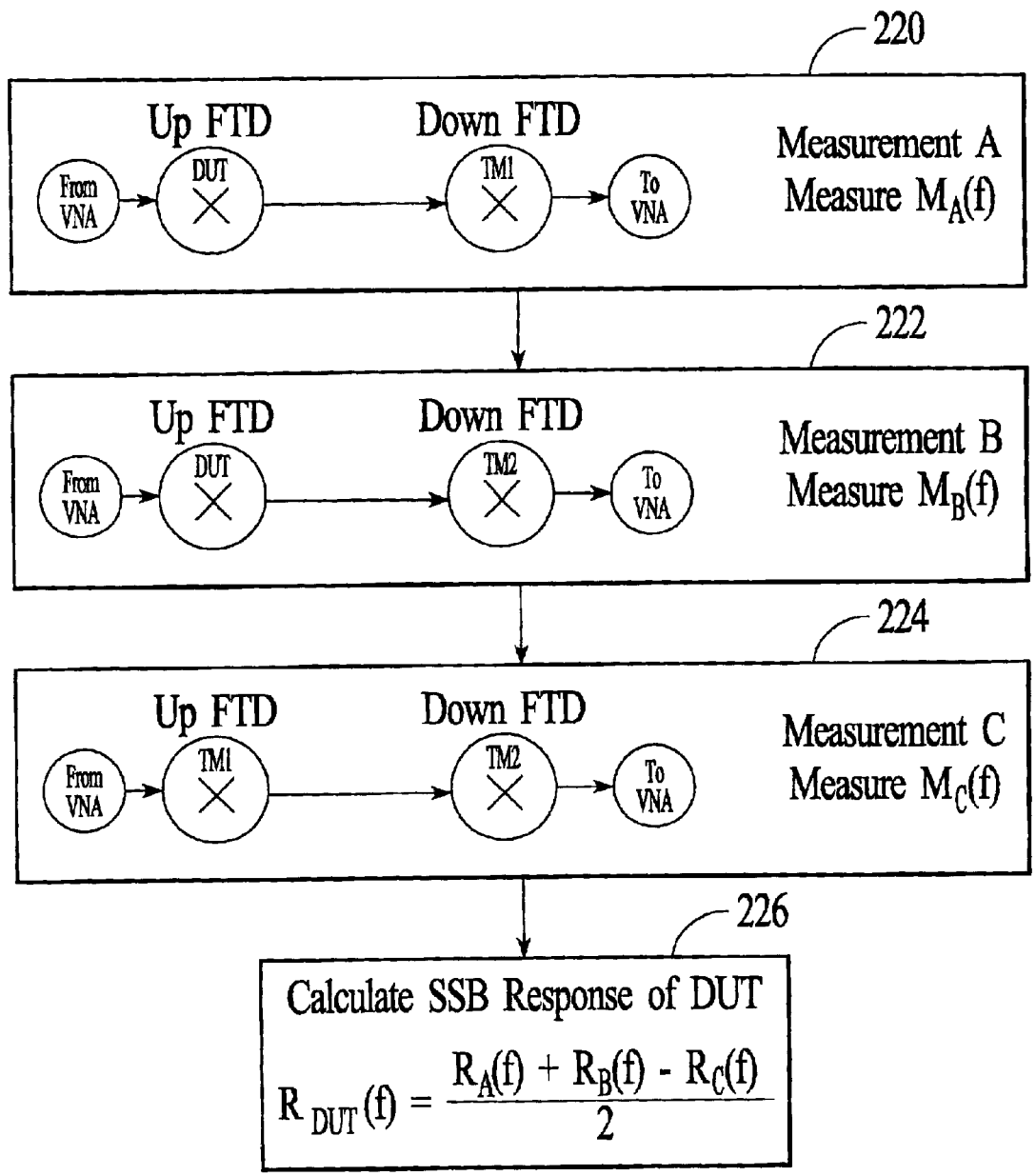
FIG. 2 is a measurement flow diagram for characterizing a single side band conversion response that indicates the different combinations of a DUT, TM1, and TM2 that are used to characterize the DUT.

As described above with reference to FIG. 2, test mixer 1 (TM1) is the reciprocal FTD because TM1 is used for down-conversion in measurement A and for up-conversion in measurement B. When characterizing the single side band conversion response of a DUT with a LAR-based reciprocal FTD, the measurement approach described with reference to FIG. 2 is followed using the three-pair measurement system 1500 of FIG. 15 and the below-described modifications. Referring back to FIG. 2, during measurement A (step 220), modulated light is supplied to the mixer LAR(s) of the reciprocal FTD (TM1) which is located in the down-conversion FTD 1512 position. The modulated light periodically activates the LAR(s), thereby causing the input signal and the LO to mix. The LAR-based FTD and the modulated light source are utilized to ensure that TM1 exhibits a reciprocal conversion response when being used as the down-conversion FTD and as the up-conversion FTD 1510. During measurement A, the up-conversion FTD (the DUT) receives the LO and does not receive the modulated light.

During measurement B (step 222), neither FTD 1410 nor FTD 1512 utilize LARs and therefore no modulated light is supplied to the FTDs. During measurement B, the switch/splitter 1518 acts as a splitter and delivers the LO directly to the FTDs to perform frequency translation. As shown in FIG. 2 at step 222, the DUT is used as the up-conversion FTD and TM2 is used as the down-conversion FTD.

During measurement C (step 224), modulated light is supplied to the LAR(s) of the reciprocal FTD (TM1) which is located in the up-conversion FTD 1510 position. The modulated light periodically activates the LAR(s), thereby causing the input signal and the LO to mix. In an embodiment, the same intensity of modulated light is supplied to TM1 in steps A and C. During measurement C, the down-conversion FTD (TM2) receives the LO and does not receive the modulated light. In an embodiment, the single side band response of the DUT is calculated as shown in step 226 of FIG. 2, where $R_{DUT}(f)=[R_A(f)+R_B(f)-R_C(f)]/2$.

In the embodiment of FIG. 15, measurements A, B, and C are all made by the VNA 1502 and the response calculations are made by the controller 1504. A description of the response calculations is found in Clark.

Although the three-pair measurement technique described above involves utilizing a LAR-based FTD only for the reciprocal FTD, alternative embodiments of the three-pair measurement technique may include utilizing LAR-based FTDs for TM1 and TM2. The DUT may also be a LAR-based FTD.

Figure 3:
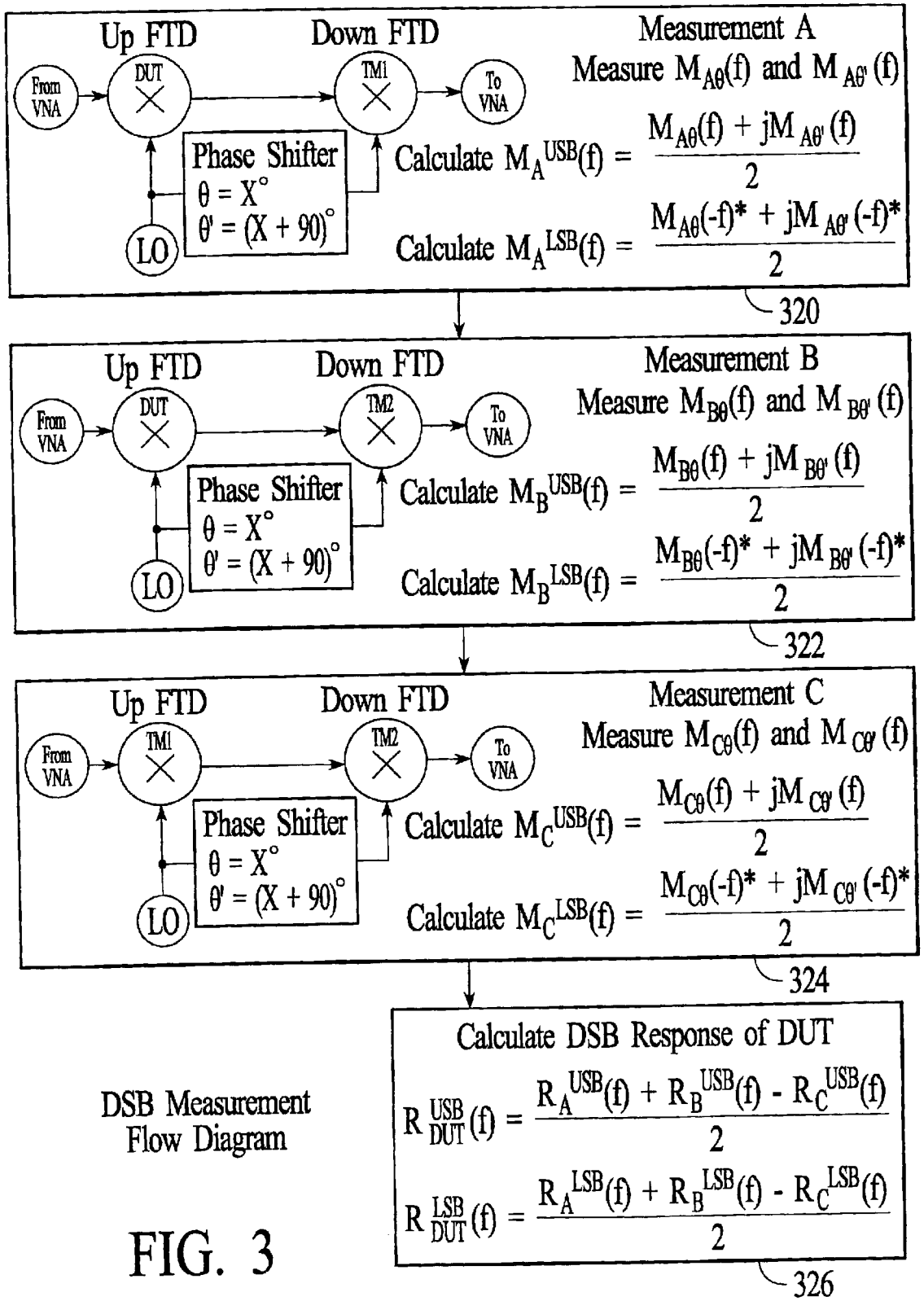
FIG. 3 is a measurement flow diagram for characterizing a double side band response that indicates the different combinations of a DUT, TM1, TM2, and the phase of the LO that are used to characterize the DUT.

The three-pair measurement system 1500 of FIG. 15 can also be used to characterize the double side band conversion response of a DUT by utilizing the phase shifter 1514 to shift the phase of the LO as described with reference to FIG. 3. Referring back to FIG. 3, during measurement A (step 320), modulated light is supplied to the mixer LAR(s) of the reciprocal FTD (TM1) which is located in the down-conversion FTD 1512 position. Because the light is modulated by the LO, the phase of the modulated light is set by the phase of the LO. During measurement A', the phase of the LO that is supplied to the modulated light source is shifted, for example, by ninety degrees. Shifting the phase of the LO produces a corresponding shift in the phase of the modulated light and a corresponding shift in the modulation phase of the LAR(s). The LAR-based FTD and modulated light source are utilized to ensure that TM1 exhibits a reciprocal conversion response when being used as the down-conversion FTD and as the up-conversion FTD 1510. During measurements A and A', the up-conversion FTD (the DUT) receives the LO and does not receive the modulated light.

During measurements B and B' (step 322), the reciprocal FTD is not used and therefore no modulated light is supplied to the FTDs 1510 and 1512. As shown in FIG. 2 at step 322, the DUT is used as the up-conversion FTD and TM2 is used as the down-conversion FTD. During measurements B and B', the switch/splitter 1518 acts as a splitter to deliver the LO to both FTDs.

During measurements C and C' (step 324), modulated light is supplied to the mixer LAR(s) of the reciprocal FTD (TM1) which is located in the up-conversion FTD 1510 position. Because the light is modulated by the LO, the phase of the modulated light is set by the phase of the LO. During measurement C', the phase of the LO that is supplied to the modulated light source is shifted, for example, by ninety degrees. Shifting the phase of the LO produces a corresponding shift in the phase of the modulated light and a corresponding shift in the modulation phase of the LAR(s). In an embodiment, the same intensity of modulated light is supplied to TM1 in steps A, A', C, and C'. During measurements C and C', the down-conversion FTD (TM2) receives the LO and does not receive the modulated light. In an embodiment, the double side band response of the DUT is calculated as shown in step 326 of FIG. 3, where the USB conversion response of the DUT is calculated as $R_{DUT\ USB}(f)=[R_{A\ USB}(f)+R_{B\ USB}(f)-R_{C\ USB}(f)]/2$ and the LSB conversion response of the DUT is calculated as $R_{DUT\ LSB}(f)=[R_{A\ LSB}(f)+R_{B\ LSB}(f)-R_{C\ LSB}(f)]/2$.

Although the three-pair measurement technique described above involves utilizing a LAR-based FTD only for the reciprocal FTD, alternative embodiments of the three-pair measurement technique may include utilizing LAR based FTDs for TM1 and TM2. Additionally, although the three-pair measurement system 1500 of FIG. 15 depicts a single LO source, multiple LO sources may be utilized to modulate the FTDs.

Although specific embodiments of the invention have been described and illustrated, the invention is not limited to the specific forms and arrangements of parts so described and illustrated. The invention is limited only by the claims.

What is claimed is:

1. A frequency translating device (FTD) that utilizes a local oscillator (LO) to convert a radio frequency (RF) to an intermediate frequency (IF) and to convert an IF to a RF, said FTD comprising:
   means for controlling variations in capacitance of said FTD to produce a reciprocal conversion response between said down-conversion and said up-conversion, said means for controlling variations in capacitance of said FTD including:
   at least one light-activated resistor (LAR) connected to down-convert an RF to an IF and to up-convert an IF to an RF; and
   a source of modulated light that is optically connected to said at least one LAR, said source of modulated light generating modulated light that is related to said LO, said at least one LAR being activated in response to said modulated light from said modulated light source.

2. The FTD of claim 1 wherein said modulated light source includes a light source that is directly modulated by said LO.

3. The FTD of claim 1 wherein said modulated light source includes a light source and a transmission switch that transmits or blocks transmission of light in response to said LO.

4. The FTD of claim 1 wherein said modulated light source includes a light source and a light path switch, wherein said light path switch is modulated by said LO.

5. The FTD of claim 1 further including a second LAR connected to down-convert an RF to an IF and to up-convert an IF to an RF, said second LAR being optically connected to said source of modulated light.

6. The FTD of claim 5 wherein said modulated light source includes a light source and a light path switch that is optically connected to said at least one LAR and to said second LAR.

7. The FTD of claim 1 further including second, third, and fourth LARs connected to down-convert an RF to an IF and to up-convert an IF to an RF, said second, third, and fourth LARs being optically connected to said source of modulated light.

8. The FTD of claim 7 wherein said modulated light source includes a light source and a light path switch that is optically connected to said at least one LAR, said second, said third, and said fourth LARs, wherein said light path switch is modulated by said LO.

9. A method for operating a frequency translating device (FTD), said method comprising:
   providing modulated light to at least one light-activated resistor (LAR) that is modulated in response to a local oscillator (LO);
   down-converting a radio frequency (RF) to an intermediate frequency (IF) using said at least one LAR, said down-conversion having a down-conversion response; and
   up-converting an IF to an RF using said at least one LAR, said up-conversion having an up-conversion response;
   wherein variations in capacitance of said at least one LAR are controlled during said down-conversion and said up-conversion to make said down-conversion response reciprocal to said up-conversion response.

10. The method of claim 9 wherein said step of providing modulated light includes a step of directly modulating a light source with said LO.

11. The method of claim 9 wherein said step of providing modulated light includes a step of modulating a transmission switch with said LO.

12. The method of claim 9 wherein said step of providing modulated light includes a step of switching light between at least two transmission paths in response to said LO.

13. The method of claim 9 wherein said FTD is used for down-conversion and up-conversion in a three-pair measurement method.

14. A system for determining the conversion response of a device under test (DUT), the DUT is a frequency translation device (FTD), the system comprising:
   means for coupling the DUT to a first test FTD (TM1) during a first measurement, for coupling said DUT to a second test FTD (TM2) during a second measurement, and for coupling said TM1 to said TM2 during a third measurement, said TM1 and TM2 are FTDs, said first measurement provides a first conversion response of said DUT coupled with said TM1 with one of the coupled DUT and TM1 being an up-converter FTD and the other one of said coupled DUT and TM1 being a down-converter FTD, said second measurement provides a second conversion response of said DUT coupled to said TM2 with one of said coupled DUT and TM2 being an up-converter FTD and the other one of said coupled DUT and TM2 being a down-converter FTD, the third measurement provides a third conversion response of said TM1 coupled with said TM2 with one of said coupled TM1 and TM2 being an up-converter FTD and the other one of said coupled TM1 and TM2 being a down-converter FTD, one of said TM1 FTD and TM2 FTD has reciprocal up-conversion and down-conversion responses, said reciprocal FTD is an up-converter during one of said first, second, or third measurements and is a down-converter during another one of said first, second, or third measurements, said reciprocal FTD including;
   means for controlling variations in capacitance of said reciprocal FTD to produce said reciprocal conversion response between said down-conversion and said up-conversion, said means for controlling variations in capacitance of said reciprocal FTD including;
   at least one light-activated resistor (LAR) connected to down-convert and to up-convert; and
   a source of modulated light that is optically connected to said at least one LAR, said source of modulated light generating modulated light that is related to a local oscillator (LO), said at least one LAR being activated in response to said modulated light from said modulated light source;
   an analyzer for measuring said first, second, and third measurements by providing an input signal at a first connection and by sampling an output signal from a second connection; and
   a controller for calculating the conversion response of said DUT from said first, second, and third conversion responses.

15. The system of claim 14 wherein said modulated light source includes a light source and a transmission switch that transmits or blocks transmission of light in response to said LO.

16. The system of claim 14 further including an LO source for providing said LO to said source of modulated light.

17. The system of claim 14 further including a second LAR connected to down-convert an RF to an IF and to up-convert an IF to an RF, said second LAR being optically connected to said source of modulated light.

18. The system of claim 17 wherein said modulated light source includes a light source and a light path switch that is optically connected to said at least one LAR and to said second LAR.

19. The system of claim 14 further including second, third, and fourth LARs connected to down-convert an RF to an IF and to up-convert an IF to an RF, said second, third, and fourth LARs being optically connected to said source of modulated light.

20. The system of claim 19 wherein said modulated light source includes a light source and a light path switch that is optically connected to said at least one LAR, said second, said third, and said fourth LARs, wherein said light path switch is modulated by said LO.

21. The system of claim 14 wherein said analyzer includes means for measuring said first, second, and third conversion responses by providing an input signal at said first connection and by sampling the output signal at said second connection, for repeating said first measurement with said LO used by said source of modulated light phase shifted ninety degrees to provide a first repeated conversion response, for repeating said second measurement with said LO of one of the up or down converters phase shifted ninety degrees to provide a second repeated conversion response, and for repeating said third measurement with said LO used by said source of modulated light phase shifted ninety degrees to provide a third repeated conversion response, said reciprocal FTD is an up-converter during one of said first, second, or third measurements and respectively during said first, second, or third repeated measurements and is a down-converter during another one of said first, second, or third measurements and respectively during said first, second, or third repeated measurements; and wherein said controller includes means for calculating the conversion response of said DUT from said first, second, and third conversion responses and said first, second, and third repeated conversion responses.

22. A method for determining the conversion response of a device under test (DUT), the DUT is a frequency translation device (FTD), the method comprising:

measuring a first conversion response of said DUT coupled with a first test device (TM1), said TM1 is an FTD, one of said coupled DUT and TM1 is an up-converter FTD and the other one of said coupled DUT and TM1 is a down-converter FTD;

measuring a second conversion response of said DUT coupled with a second test device (TM2), said TM2 is an FTD, one of said coupled DUT and TM2 is an up-converter FTD and the other one of said coupled DUT and TM2 is a down-converter FTD;

measuring a third conversion response of said TM1 coupled with said TM2, one of said coupled TM1 and TM2 is an up-converter FTD and the other one of said coupled TM1 and TM2 is a down-converter FTD, one of said TM1 FTD and TM2 FTD has reciprocal up-conversion and down-conversion responses, said reciprocal FTD is an up-converter during one of said first, second, or third measurements and is a down-converter during another one of said first, second, or third measurements, said reciprocal FTD including at least one light-activated resistor (LAR), wherein operation of said reciprocal FTD includes;

providing modulated light to said at least one LAR that is modulated in response to a local oscillator (LO), wherein variations in capacitance of said at least one LAR are controlled to make said down-conversion response reciprocal to said up-conversion response; and calculating the conversion response of said DUT from said first, second, and third conversion responses.

23. The method of claim 22 wherein said step of providing modulated light includes a step of directly modulating a light source with said LO.

24. The method of claim 22 wherein said step of providing modulated light includes a step of modulating a transmission switch with said LO.

25. The method of claim 22 wherein said step of providing modulated light includes a step of switching light between at least two transmission paths in response to said LO.

26. The method of claim 22 comprising:

repeating said first measurement with said LO used to provide said modulated light phase shifted ninety degrees to provide a first repeated conversion response;

repeating said second measurement with said LO of one of said up or down converters phase shifted ninety degrees to provide a second repeated conversion response;

repeating said third measurement with said LO used to provide said modulated light phase shifted ninety degrees to provide a third repeated conversion response, said reciprocal FTD is an up-converter during one of said first, second, or third measurements and respective first, second, or third repeated measurements and is a down-converter during another one of said first, second, or third measurements and respective first, second, or third repeated measurements; and calculating the conversion response of said DUT from said first, second, and third conversion responses and said first, second, and third repeated conversion responses.

* * * * *